United States Patent [19]
Ostrowski

[11] Patent Number: 5,769,427
[45] Date of Patent: Jun. 23, 1998

[54] DUAL SEAL WITH CLEAN BARRIER FLUID AND DYNAMIC PRESSURE CONTROL

[75] Inventor: Michael H. Ostrowski, Lake Forest, Ill.

[73] Assignee: Chesterton International Company, Stoneham, Mass.

[21] Appl. No.: 727,194

[22] Filed: Oct. 8, 1996

Related U.S. Application Data

[63] Continuation-in-part of Ser. No. 527,458, Sep. 13, 1995, Pat. No. 5,636,847.
[51] Int. Cl.[6] .................................................... F16J 15/34
[52] U.S. Cl. ............................. 277/3; 277/15; 277/17; 277/28; 277/59; 277/65; 277/72 R
[58] Field of Search ................................. 277/3, 15, 17, 277/18, 22, 28, 59, 65, 72 R, 81 R

[56] References Cited

U.S. PATENT DOCUMENTS 5,516,119  5/1996  Trackwell et al. ......................... 277/3

*Primary Examiner*—Scott Cummings
*Attorney, Agent, or Firm*—Lahive & Cockfield, LLP

[57] ABSTRACT

A seal arrangement for a stuffing box, the stuffing box having an outboard seal an inboard seal exposed to process fluid, and a volume pressurized with barrier fluid in which the inboard seal and the outboard seal are disposed, has a container divided into at least two non-communicating chambers by a movable wall, with a first of the chambers being supplied with barrier fluid and communicating with the space in the stuffing box in which the outboard seal is disposed, and a second of the chambers communicating with the stuffing box so as to be at the stuffing box pressure. The movable wall constantly strives to assume an equilibrium position wherein substantially no pressure differential exists across the inboard seal. Due to the absence of such a pressure differential, substantially no contamination of the barrier fluid by the process fluid occurs, and vice versa. Additionally, due to the extremely small amount of clean barrier fluid which is lost during continued operation, barrier fluid replenishment is highly simplified and maintenance-free. The container may also house a barrier fluid reservoir.

28 Claims, 7 Drawing Sheets

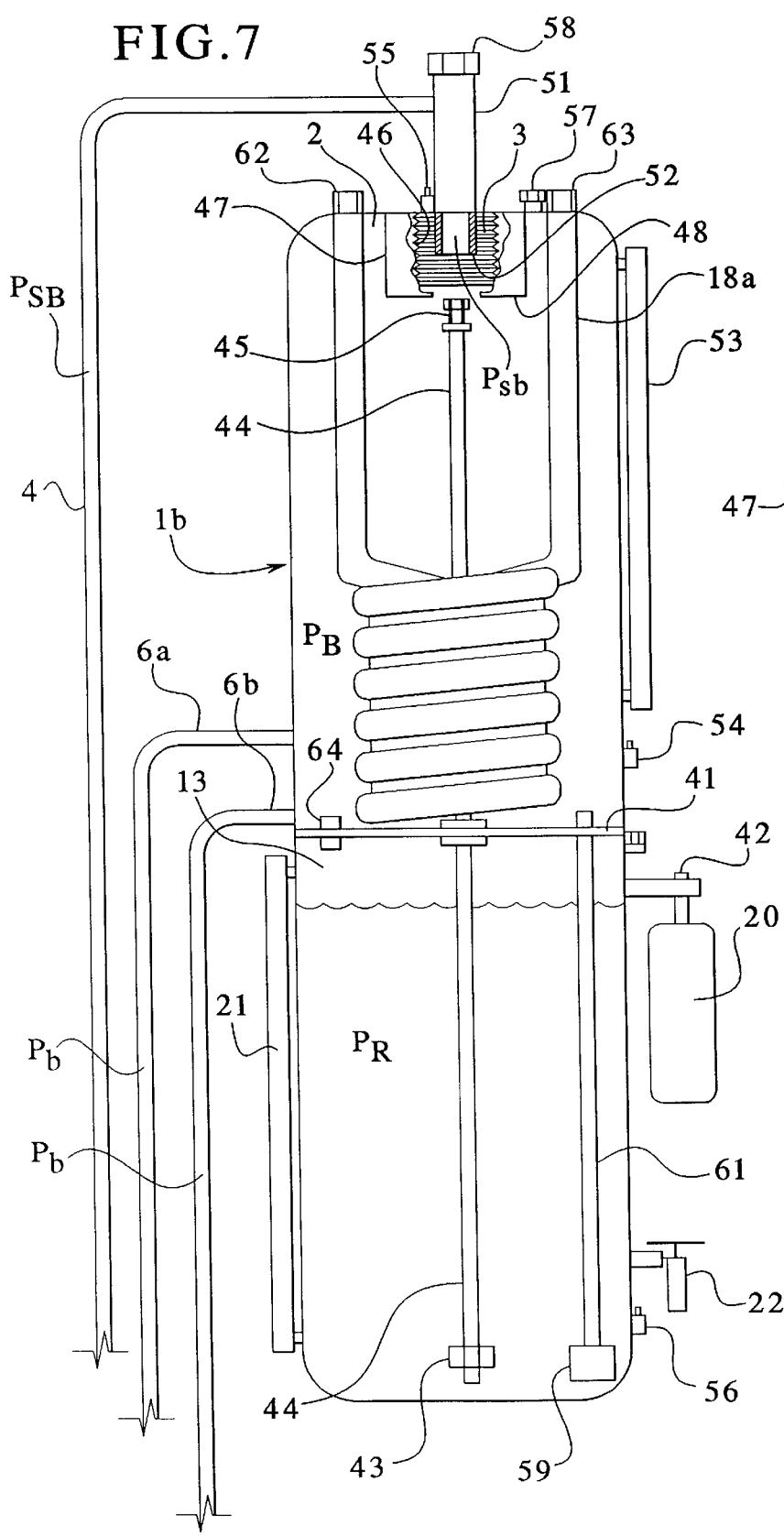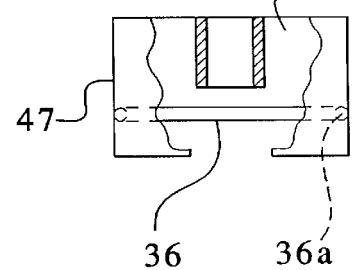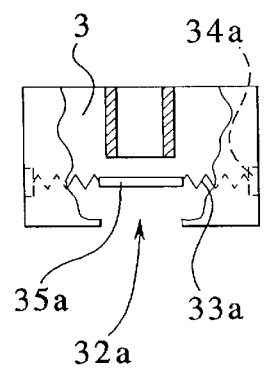

DUAL SEAL WITH CLEAN BARRIER FLUID AND DYNAMIC PRESSURE CONTROL

This application is a continuation-in-part of application Ser. No. 08/527,458 filed on Sep. 13, 1995, now U.S. Pat. No. 5,636,847.

BACKGROUND OF THE INVENTION

1. Field of the Invention

The present invention is directed to dual mechanical seals, such as a face seals, of the type wherein an inboard seal is exposed, in a stuffing box, to a process fluid and an outboard seal is exposed to pressurized a barrier fluid.

2. Description of the Prior Art

In mechanical seals known as dual face seals, two pairs of relatively rotating seal faces, such as two seal faces affixed in some manner to a stuffing box housing and two rotating seal faces fixed to the shaft of rotary equipment, are employed to isolate and seal a pressurized liquid, referred to as the process fluid, along the rotating shaft. In order to cool the seal faces and to assist in preventing passage of process fluid across the seal faces, a second pressurized liquid, a barrier fluid, is often introduced between the two seals.

Seals of this general type are commercially available, for example, from A. W. Chesterton Company under product model nos. 225, 255 and 280. In such seals, the seal which is exposed to the process fluid is referred to as the inboard seal, and the seal which is (ideally) only exposed to the barrier fluid is referred to a s the outboard seal. The barrier fluid in such seals is usually selected dependent on properties such as lubricating capability, heat conveying or heat dissipation capability and compatibility with the process fluid being sealed, the seal components and to the environment, since a small amount of the barrier leak into the process and/or the environment. The process fluid, by contrast, may be any type of industrial fluid which must be conveyed from one location to another by means of a pressure differential in a line containing the process fluid typically by means of a pump containing mechanical seals. In most instances it is desired to keep the barrier fluid and the process fluid separated as completely as possible, to avoid either contaminating the process fluid with barrier fluid, or vice versa. In cases such as extremely corrosive, toxic, radioactive, or volatile organic compound process fluids, it is desirable to avoid contaminating the barrier fluid with the process fluid because this will then result in a mixture of the process fluid and barrier fluid leaking across the outboard seal and into the environment. In some instances, the necessity of avoiding this leakage into the environment has required the use of sealess pumps, special gas seals or a piping system to a plant incineration system to burn off undesired gases, or a vapor recovery system to prevent gases from escaping into the atmosphere. Additionally, if the process fluid is intended for human use or consumption, such as a component of a food product or a cosmetic product, there is often a necessity to prevent the process fluid from being contaminated by the barrier fluid.

In known systems making use of a barrier fluid, contamination of the process fluid by the barrier fluid, and vice versa, has been attempted to be accomplished primarily by confinement, i.e., by trying t o maintain the mechanical locations at which the barrier fluid and process fluid have an opportunity to mix as few as possible and as small as possible. In a barrier seal system disclosed in U.S. Pat. No. 5,249,812, for example, the barrier fluid is pressurized from a gravity feed line, and a barrier fluid containment device is attached to the high pressure side of the seal in an effort to prevent process fluid from contaminating the seal faces. In a stuffing box lubricator disclosed in U.S. Pat. No. 5,305,854, a check valve in the fluid flow path between the stuffing box and the lubrication reservoir prevents the flow of spent hydraulic fluid from the stuffing box into the lubrication reservoir in the event of a seal leak or failure.

In a hydrostatic face seal and bearing assembly disclosed in U.S. Pat. No. 5,052,694, a high pressure cavity is provided in one of two opposed sealing faces between a shaft and a housing for supplying a pressurized barrier fluid between the opposed sealing faces. Passage of the barrier fluid into the interior of the housing and passage of the process fluid from the housing into the high pressure cavity is stated to be achieved by employing a circumferential dam which forms a narrow gap between the high pressure cavity and the interior of the housing, and a system is also provided for maintaining the pressure of the barrier fluid in the high pressure cavity substantially equal to the pressure of the process fluid in the housing. A sealing mechanism for a reciprocating apparatus is disclosed in U.S. Pat. No. 4,769,992 wherein a fluid such as oil is enclosed in a fluid chamber formed by a pair of flexible partitioning members, such as diaphragms or multiple bellows, and the sidewalls of a cylinder. The fluid chamber is divided into two parts by a pressure-resistive sealing member which is affixed to an inside wall of a rigid partition, so as to roughly seal the fluid while still permitting sliding motion of the reciprocating member within the cylinder.

A shaft seal is disclosed in U.S. Pat. No. 4,128,248 in the form of a dynamic packing having a wall which separates an oil-containing space from an oil-free space, or from the atmosphere, formed by two shaft sealing rings which engage the shaft and which define an oil-filled gap therebetween. Respective conduits lead from the oil-free space and from the oil-filled gap and terminate at one side of a diaphragm, the opposite side of the diaphragm being exposed to a reference pressure, for the purpose of relieving excess pressure in the oil-filled gap.

An apparatus for preventing leakage from an enclosed space or a circulating system which contains a noxious fluid is disclosed in U.S. Pat. No. 3,161,413, wherein a compensating chamber is in fluid communication with each of a "clean" chamber and a "contaminated" chamber. The compensating chamber has an element therein, such as a piston or diaphragm, which physically separates the contaminated chamber from the clean chamber, but which permits a steady state pressure equilibrium to be reached between the other two chambers.

Another type of packing arrangement for a stuffing box is disclosed in U.S. Pat. No. 943,169, wherein a pressurized fluid is maintained at a selected pressure by a screw operated piston contained in a fluid reservoir.

Lastly, a shaft seal is disclosed in U.S. Pat. No. 2,127,591 which has a bellows arrangement which is in communication with a chamber disposed between two sealing surfaces. The bellows maintains the chamber at a pressure which slightly exceeds a pressure in the surrounding crank case so that if any leakage occurs, it is from the interior of the chamber into the crank case, rather than vice versa. It is also stated in U.S. Pat. No. 2,127,591, however, that the pressure in the interior of the chamber and the pressure in the crank case can be substantially balanced.

SUMMARY OF THE INVENTION

It is an object of the present invention to provide a dual mechanical face seal wherein barrier fluid pressure is dynamically controlled to precisely equal process pressure.

It is a further object of the present invention to provide a dual mechanical face seal, wherein seal elements are pressurized by means of a barrier fluid, in which there is substantially zero leakage of process fluid into barrier fluid and into the atmosphere.

It is a further object of the present invention to provide a mechanical face seal wherein, due to an extremely low leakage of clean barrier fluid and automatic replenishing thereof, no emissions monitoring and minimal routine maintenance are necessary.

It is a further object of the present invention to provide a mechanical face seal wherein no expensive equipment, such as an incineration system, a flare tower, or vapor recovery system, is necessary in order to accommodate or remove any process fluid which may leak from the system.

It is a further object of the present invention to provide a dual mechanical seal with substantially zero process fluid leakage and which does not consume significant amounts of continuous barrier gas in order to achieve the above-described benefits.

The above objects are achieved in accordance with the principles of the present invention in a mechanical face seal, and in a sealing method, wherein the barrier fluid is supplied to a barrier fluid container by means of a replenishing device, such as a pump, or gas-charged fluid reservoir, the replenishing device operating at a high pressure and generating a very low flow of barrier fluid. The barrier fluid container is divided into two non-communicating volumes, the two volumes being separated by a immovable wall, such as a bellows or a diaphragm or a floating piston. One volume contains the barrier fluid, and the other volume is in communication with the stuffing box housing, so as to be at the stuffing box pressure. The volume of the fluid container which contains the barrier fluid is in communication with a space within the stuffing box in which sealing elements are mounted so as to be pressurized by the barrier fluid. Since the bellows is at the stuffing box pressure at one side thereof, and at the barrier fluid pressure at the opposite side, the bellows will automatically seek an equilibrium position which causes the barrier fluid to be maintained at a pressure which is equal to the stuffing box pressure. There is thus no tendency for flow across the inboard seal, because there is no pressure differential across the inboard seal element. The barrier fluid therefore remains extremely clean, not being contaminated by the process fluid, and the process fluid is similarly not contaminated by the barrier fluid.

A check valve can be provided in the line leading from the barrier fluid replenisher to the barrier fluid container, permitting flow only in one direction, into the container. If a catastrophic failure of the system occurs, therefore, the check valve would prevent barrier fluid, which under those circumstances would be highly contaminated with process fluid, from flowing back to the barrier fluid replenisher and/or the barrier fluid reservoir.

In order to compensate differences in line lengths, differences in line diameter, etc. with respect to the line at stuffing box pressure extending between the container and the stuffing box, and the line through which the barrier fluid is supplied from the container to the stuffing box, a spring can be provided in the container which biases the bellows so that, in the stuffing box, there is no pressure differential between the inboard seal and the outboard seal.

As an option to further control the system, sensors and a controller of any suitable type, such as a position sensor, a temperature sensor, a pressure sensor, a particle sensor, etc. can be provided in the container so as to have a sensing element which interacts with the volume of the container which is at the stuffing box pressure and position of the bellows. The sensor generates an output signal which is supplied to a control unit which controls the operation of the barrier fluid replenisher. A flow sensor can be connected in the line between the barrier fluid reservoir and the container, to control the replenishing flow rate from the reservoir. To the extent that any changes in the sensed parameter require a change in the amount of barrier fluid which is replenished into the volume of the container which contains the barrier fluid, a feedback control can be established using the output of the sensor to control the speed, duration of operation, etc. of the barrier fluid replenisher.

In an embodiment of the system, which does not require an active barrier fluid replenisher such as a pump, the barrier fluid reservoir is connected directly (through the aforementioned check valve) to the volume in the container which contains the barrier fluid, with a free space at the top of the barrier fluid reservoir being maintained at a pressure, by means of a gas bottle connected thereto, which causes a sufficient amount of barrier fluid to be replenished into the container. A mechanical valve, such as a needle-and-seat or spool valve, can be provided within the container which is responsive to movement of the bellows. If the stuffing box pressure momentarily exceeds the barrier fluid pressure, for example, this would cause the valve to open to permit more barrier fluid to be supplied to the container, thereby again establishing equilibrium between the barrier fluid pressure and the stuffing box pressure.

The bellows, which may be formed or welded metal compatible with the barrier fluid and process fluid, or an elastomeric diaphragm or a floating piston, in the container which contains the barrier fluid provides absolute separation between the barrier fluid and the process fluid. By the operation of the bellows, there is no pressure drop across the inboard seal faces, therefore there is no opportunity of leakage of barrier fluid into the process fluid. Moreover, by the use of the aforementioned additional controls, parameters other than merely the stuffing box and barrier fluid pressures can be monitored in order to maintain pressures on opposite sides of the bellows in the container which produce no pressure differential across the inboard seals.

In another embodiment, the barrier fluid reservoir is accommodated within the single container that also houses the barrier fluid chamber and process fluid chamber. The barrier fluid chamber is separated from the process fluid chamber by the movable impermeable wall which may be in the form of a bellows, a diaphragm, a floating piston or other similar device. In this embodiment, the barrier fluid reservoir is preferably disposed underneath the barrier fluid chamber. Further, in this embodiment, the process fluid chamber is preferably disposed on top of the barrier fluid chamber to facilitate the initial filling of the process fluid chamber and also to facilitate any periodic servicing required for the bellows, diaphragm or piston. In this embodiment, where the barrier fluid reservoir is disposed underneath the barrier fluid chamber, the line or tube which transfers barrier fluid from the reservoir to the chamber may be disposed within the container.

The system is self-contained, and no continuous supply of barrier gas is needed nor is there any need to vent to an incinerator, flare tower or to a vapor recovery system to accommodate barrier fluid leakage.

Moreover, the system requires extremely low maintenance. In the embodiment which employs a pump, no "extra" maintenance is needed at all. In the embodiments which employ a gas bottle to pressurize the barrier fluid in the barrier fluid reservoir, the amount of barrier fluid leakage is so small (approximately 50 cc/mol.) that up to three years may pass before replacement of the gas bottle and refill of the barrier fluid reservoir needed. For example, a single 3"×6" gas cartridge can be employed for a barrier fluid reservoir having a one gallon capacity.

In the volume of the container in which the barrier fluid is contained, a heat exchanger coil may be provided so as to assist in temperature control at the seal location. Due to the absence of a pressure differential across the inboard seal, however, less heat will be generated at that location and consequently the temperature of the barrier fluid will be less elevated than in conventional seal systems. Thus, a smaller or lower capacity heat exchanger coil can be used than in known systems.

Also, because of the extremely low leakage of barrier fluid, additives to the barrier fluid can be used in order to customize the barrier fluid for a particular application, without concern that such additives or the barrier fluid itself will contaminate the process by leaking into the process fluid across the inboard seal.

A further advantage obtained with the system disclosed herein is that the shock to the overall process handling system in which the inventive seal system is used will be less upon shut-down and subsequent start-up of the overall system. This is believed to be because of the absence of a pressure differential across the inboard seal upon shut-down of the overall system, at which point the stuffing box pressure and the barrier fluid pressure are both zero. The absence of a pressure differential across the inboard seal upon start-up results in less mechanical shock to the system thereby significantly reducing the failure rate of the seal system and other components of the overall system.

DESCRIPTION OF THE DRAWINGS

FIG. 7 is a partial schematic illustration of a seventh embodiment of a seal system constructed in accordance with the principles of the present invention.

FIG. 8 is a partial schematic illustration of an eighth embodiment of a seal system constructed in accordance with the principles of the present invention.

FIG. 9 is a partial schematic illustration of a ninth embodiment of a seal system constructed in accordance with the principles of the present invention.

DESCRIPTION OF THE PREFERRED EMBODIMENTS

Figure 1:
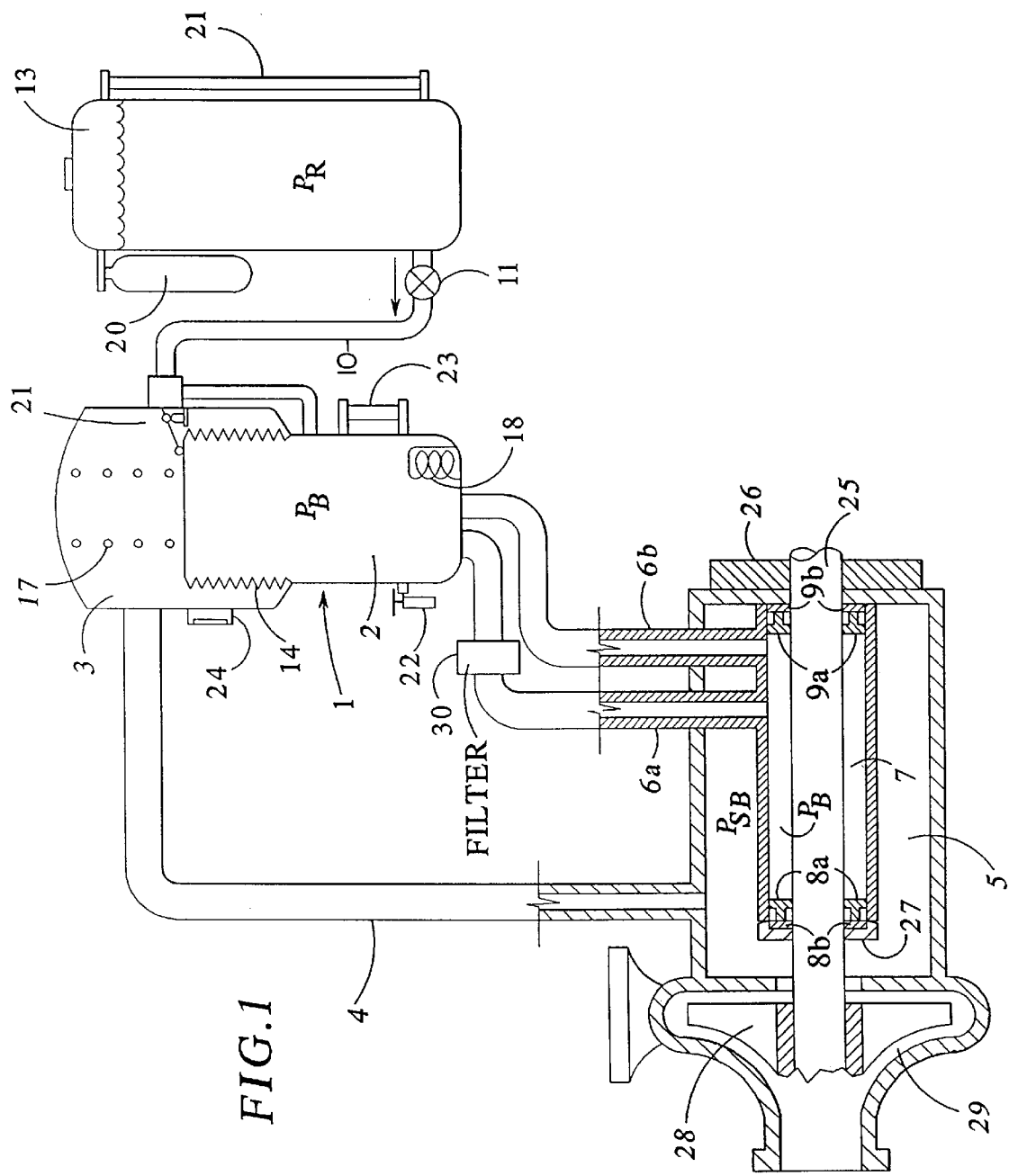
FIG. 1 is a schematic illustration of a first embodiment of a seal system constructed in accordance with the principles of the present invention.

As shown in FIG. 1, a seal system includes a container 1 which is divided into a lower chamber 2 and an upper chamber 3, the chambers 2 and 3 being separated (non-communicating) by a bellows 14 consisting of impermeable material, such as metal. The upper chamber 3 is in communication, via a line 4, with a stuffing box 5 at a stuffing box pressure $P_{SB}$. An inboard seal, schematically represented by annular seal elements 8a and 8b, such as a face seal element, is disposed in the stuffing box 5 at the stuffing box pressure $P_{SB}$ and is exposed to process fluid in the stuffing box 5.

The lower chamber 2 of the container 1 is in communication via lines 6a and 6b with a space 7 of any suitable size and shape within the stuffing box 5, which is pressurizable and which contains an outboard seal, schematically represented by seal elements 9a and 9b such as a face seal.

The annular seal elements 8a and 8b forming the inboard seal are disposed at one end of the pressurizable space 7 adjacent a snap ring 27, or some other suitable holding element, and the opposite end of the pressurizable space 7 is closed by a seal gland 26. In the example used to explain the invention, the stuffing box 5 has a rotating shaft 25 extending therethrough which is rotated by any suitable means, such as a motor, to operate an impeller 28 in an impeller chamber 29 for moving the process fluid. It will be understood, however, that the inventive concept can be used in combination with any type of machinery which requires sealing of a rotating shaft or some other rotating element.

The particular details of the structure of the stuffing box 5 and the arrangement of the seal elements 8a, 8b and 9a, 9b in the space 7 do not form a part of the present invention, and may be of a conventional, known structure. Similarly, the manner by which the barrier fluid is used to assist in the operation of the seal can proceed within the stuffing box 5 in any known manner.

By virtue of the bellows 14 in the container 1, however, the system will always strive to maintain an equilibrium between the stuffing box pressure $P_{SB}$ and the barrier fluid pressure $P_B$. This means that there will be substantially no pressure differential across the inboard seal, so that the barrier fluid and the process fluid have virtually no tendency to flow in either direction. As a result of the absence of any flow tendency across the inboard seal, there will be virtually no mixing of the barrier fluid and the process fluid, and thus no contamination of either fluid by the other.

In all of the embodiments, even though virtually no barrier fluid will be "lost" into the process fluid, there may nonetheless be an intentional small amount of clean barrier fluid optimally migrating across the outboard seal in order to provide lubrication and separation of the outboard seal faces. This clean barrier fluid will be automatically replenished into the container 2 from a reservoir 13.

Figure 2:
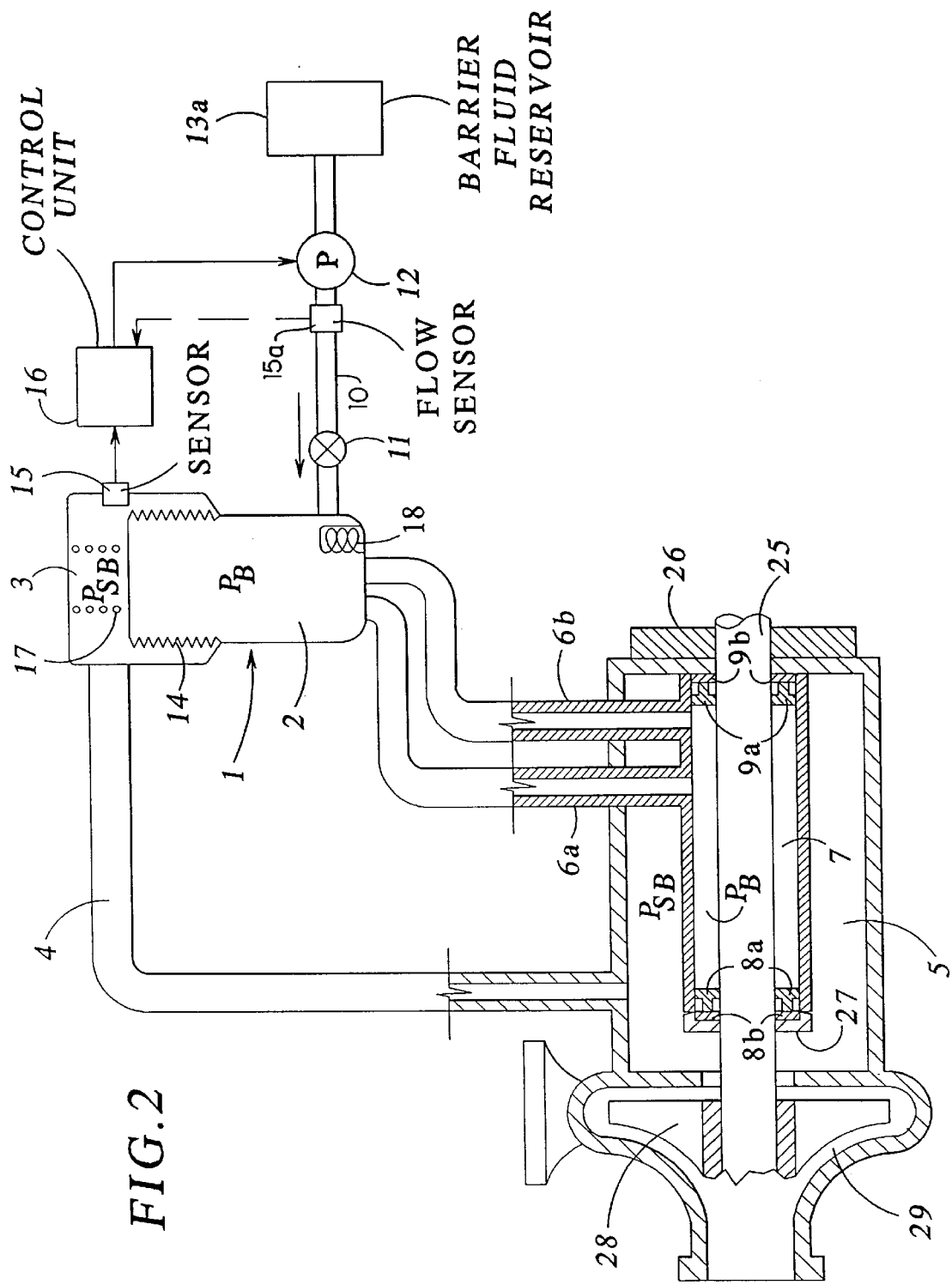
FIG. 2 is a schematic illustration of a second embodiment of a seal system constructed in accordance with the principles of the present invention.
Figure 3:
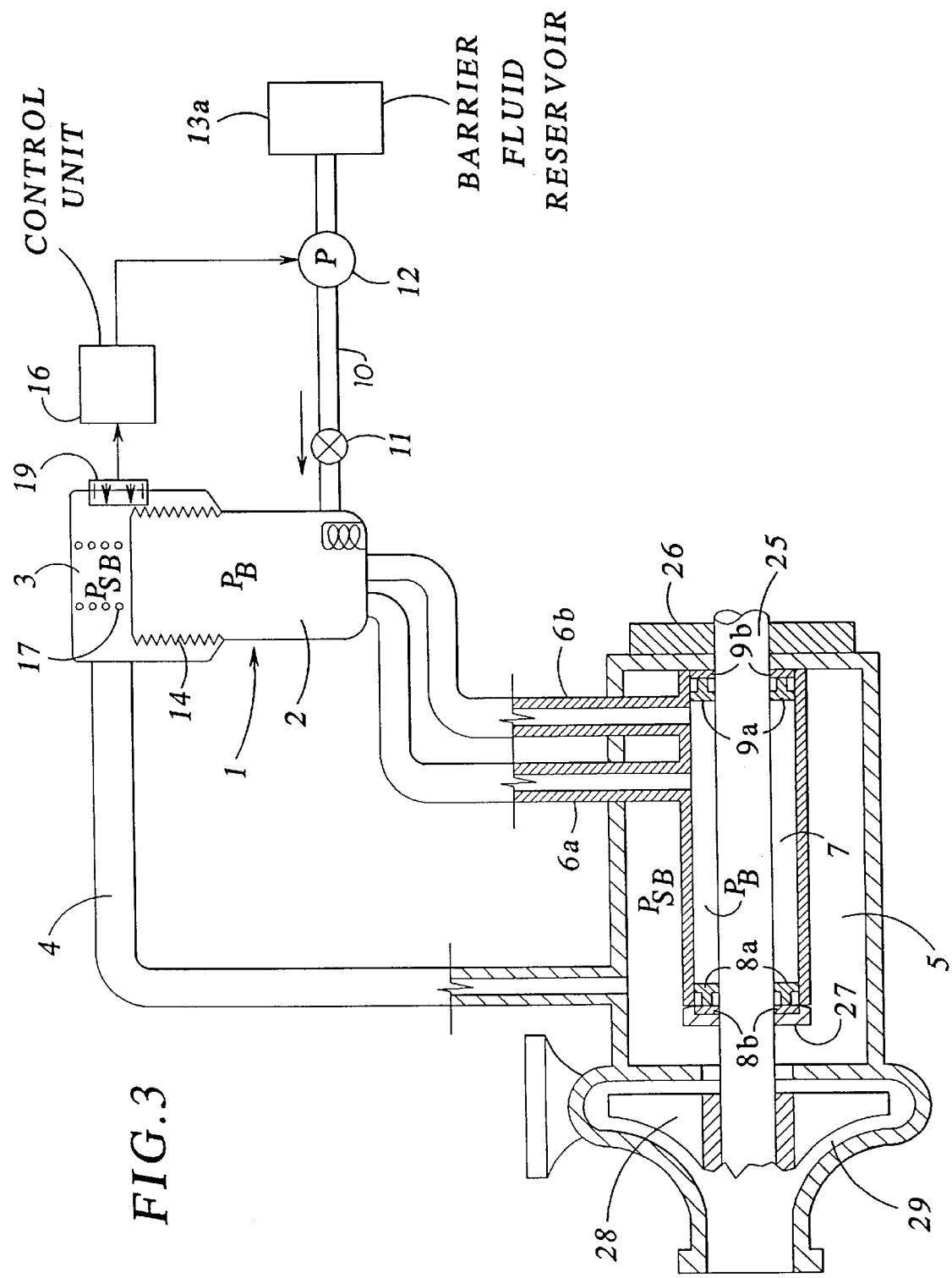
FIG. 3 is a schematic illustration of a third embodiment of a seal system constructed in accordance with the principles of the present invention.
Figure 4:
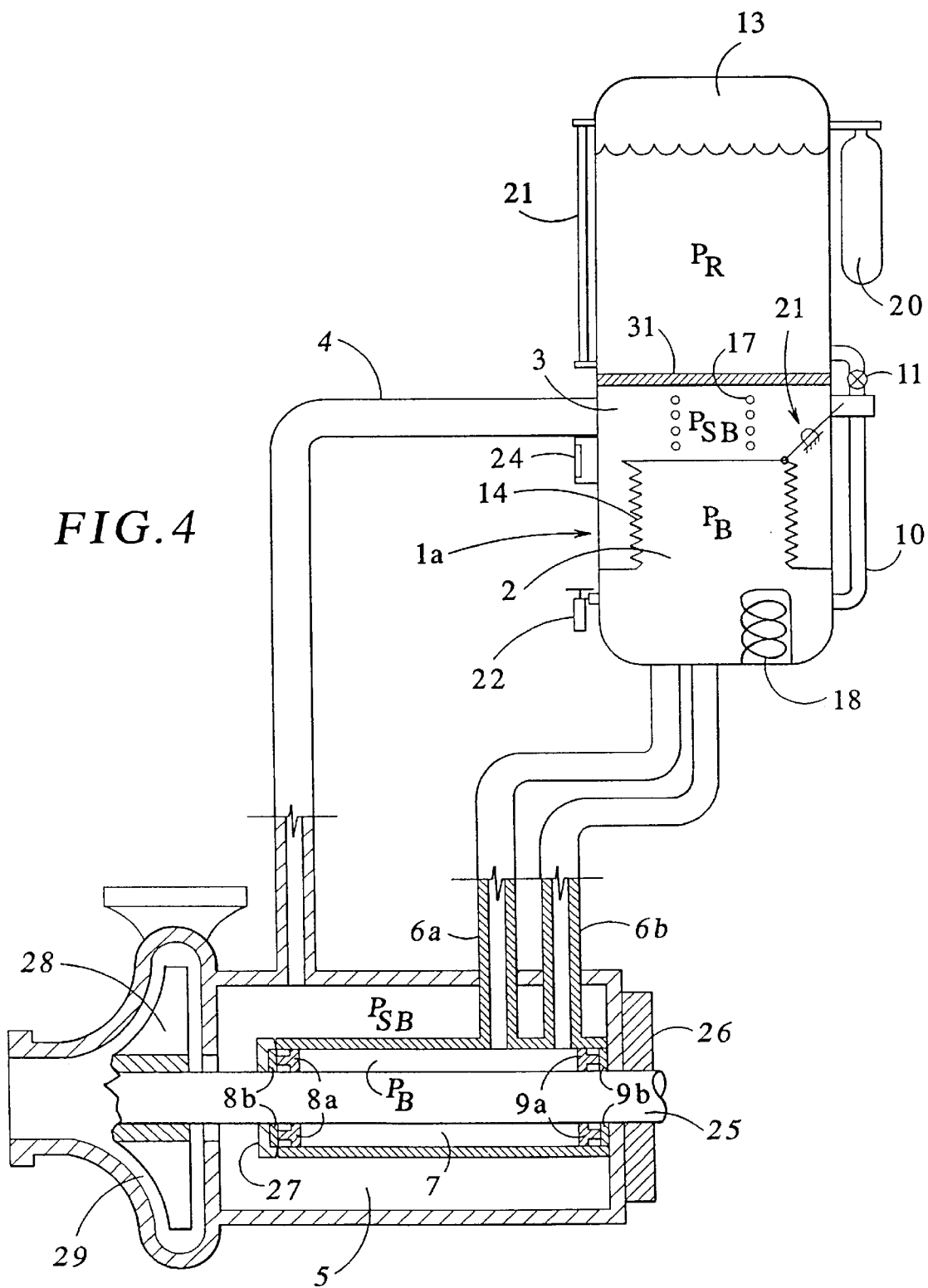
FIG. 4 is a schematic illustration of a fourth embodiment of a seal system constructed in accordance with the principles of the present invention.

The embodiments shown in FIGS. 1 and 4 employ liquid as the barrier fluid, whereas in the embodiments of FIGS. 2 and 3, the barrier fluid may either be gas or liquid. In the embodiments of FIGS. 1 and 4, the reservoir 13 contains a liquid barrier fluid at a barrier fluid reservoir pressure $P_R$. The pressure at the bottom of the reservoir 13 at a port connected to the line 10, is primarily determined by a pressurization provided by a gas bottle 20 in communication with a free space at a top of the reservoir 13. The gas bottle 20 may be a small gas cartridge, in view of the extremely small barrier fluid leakage which is expected to occur in the present system. It is expected that leakage of barrier fluid would be no more than 50 cc/mo., in which case the case bottle 20 can be a so-called 3"×6" gas cartridge containing, for example, nitrogen. At that leakage rate, if the reservoir 13 has a one gallon capacity, such a cartridge would only have to be replaced after several years, such as three years, thereby making the system extremely maintenance free. A sight glass 21 can be provided at the reservoir 13 to identify the level of barrier fluid therein.

In the embodiment of the FIG. 1, replenishment of barrier fluid into the lower chamber 2 of the container 1 is controlled by a float valve assembly 21, which includes an element which rides on the top of the bellows 14 and which is disposed at the end of a lever which is either, at its middle or opposite end, mounted so as to be pivotable. The change in position of the lever caused by movement of the top of the bellows 14 either electronically or mechanically opens and closes a valve, which permits flow of barrier fluid from the line 10 into the lower chamber 2 of the container 1. A sight glass 23 can be provided for the barrier fluid contained in the lower chamber 2, and a window 24 can be provided at a location to permit visual examination into the interior of the upper chamber 3 in the vicinity of the top of the bellows 14.

In the embodiment of FIG. 4, a container 1a is employed, which contains both the chambers 2 and 3, as well as the reservoir 13. A base 31 of the reservoir 13 simultaneously forms the upper wall of the upper chamber 3. The base 31 is impermeable to barrier fluid and process fluid.

For barrier fluid replenishment in the embodiment of FIG. 2, the lower chamber 2 of the container 1 is in communication with a barrier fluid reservoir 13a via a line 10 in which a barrier fluid replenisher 12 is connected. The barrier fluid replenisher 12 may, for example, be a pump, such as a high pressure pump so as to be capable of delivering the very small amounts of barrier fluid replenishment which may be needed. The line 10 contains a check valve 11, which permits flow only into the lower chamber 2 of the container 1. The check valve 11 prevents flow of any fluid in the opposite direction so that, in the event of a catastrophic failure wherein the barrier fluid in the lower chamber 2 would become contaminated with process fluid, the contaminated barrier fluid could not flow back into the barrier replenisher 12 or into the reservoir 13a.

Although the system will strive to achieve equilibrium solely by virtue of the operation of the bellows 14, a further refinement in the system control can be achieved by the use of a sensor 15 and a control unit 16, which controls operations of the barrier fluid replenisher 12. The sensor 15 is mounted in a wall of the container 1 so as to have its sensor element exposed for interacting with the interior of the upper chamber 3, for sensing any change in a selected parameter thereof. The sensor 15 may be of any known type, and may, for example, sense one of: the position of the top of the bellows 14, temperature, pressure, etc. Alternatively or additionally, a sensor 15a can be disposed in the line 10 for sensing barrier fluid flow therein. It is also possible to simultaneously sense more than one of these parameters, by using multiple sensors 15 and/or 15a. The output of the sensor (or sensors) 15 and/or 15a is supplied to the control unit 16, which may be a microprocessor. In the simplest case, the control unit 16 may compare the output of the sensor 15 and/or 15a to a threshold and dependent on the level of the signal 15 and/or 15a relative to the threshold, the barrier fluid replenisher 12 can be operated until the output of the sensor 15 and/or 15a substantially equals the threshold. Preferably the barrier fluid replenisher 12 is simply either turned on or off by the control unit 16, however, it is also possible for the barrier fluid replenisher 12 to be continuously operated to supply extremely small amounts of barrier fluid to the lower chamber 2, in which case the control unit 16 will cause an alteration in some operating parameter of the barrier fluid replenisher 12, such as speed, the position of a swash plate, the pitch of impeller vanes, etc.

In order to keep the control, if used, as simple as possible, the aforementioned threshold comparison is employed. More sophisticated control algorithms can be used, if desired, such as by generating a histogram of the output of the sensor 15 and/or 15a or by subjecting the output of the sensor 15 and/or 15a to various types of mathematical manipulations, such as averaging, integrating, differentiating, etc. Moreover, the control unit 16 may be programmable so as to "anticipate" changes which may be due to the cyclical use of the system (for example, day time versus night time operation, operation designed to accommodate peak periods, etc.).

In the embodiment of FIG. 3, the control of the barrier fluid replenisher 12 is accomplished simply by monitoring the height of the top of the bellows 14, or some other suitably marked location at a side of the bellows 14, by means of a height position sensor 19. In the embodiment shown in FIG. 2, there is a small range between the "on" and "off" height levels monitored by the position sensor 19 during which the barrier fluid replenisher 12 will be operated. In this embodiment, the control unit 16 is simply a switch connected to a power supply (not shown) for the barrier fluid replenisher 12, the switch being closed when the height of the bellows 14 is between the "on" and "off" levels. Needless to say, a single on/off level could be used if it is not desired to have a on-off range. Moreover, emergency levels can be designated within the position sensor 19, causing an alarm to be generated if the top of the bellows 14 exceeds the upper alarm level, or falls below the lower alarm level. These alarms levels are disposed at locations at which it will be assumed that a serious malfunction has occurred if the top of the bellows 14 ever reaches one of those positions.

In order to accommodate differences in the dimensions of the lines 4 and 6, or any other factors which may cause the respective pressures on the opposite sides of the bellows 14 to be a slightly inexact representation of the respective pressures at the inboard and outboard seals in the stuffing box 5, a spring 17 can be provided in the upper chamber 3 of the container 1 (or 1a), which biases the bellows 14 to the extent needed. Although not shown in detail, the bias exerted by the spring 17 may be adjustable, such as by means of a threaded, rotatable adjustment knob.

Figure 5:
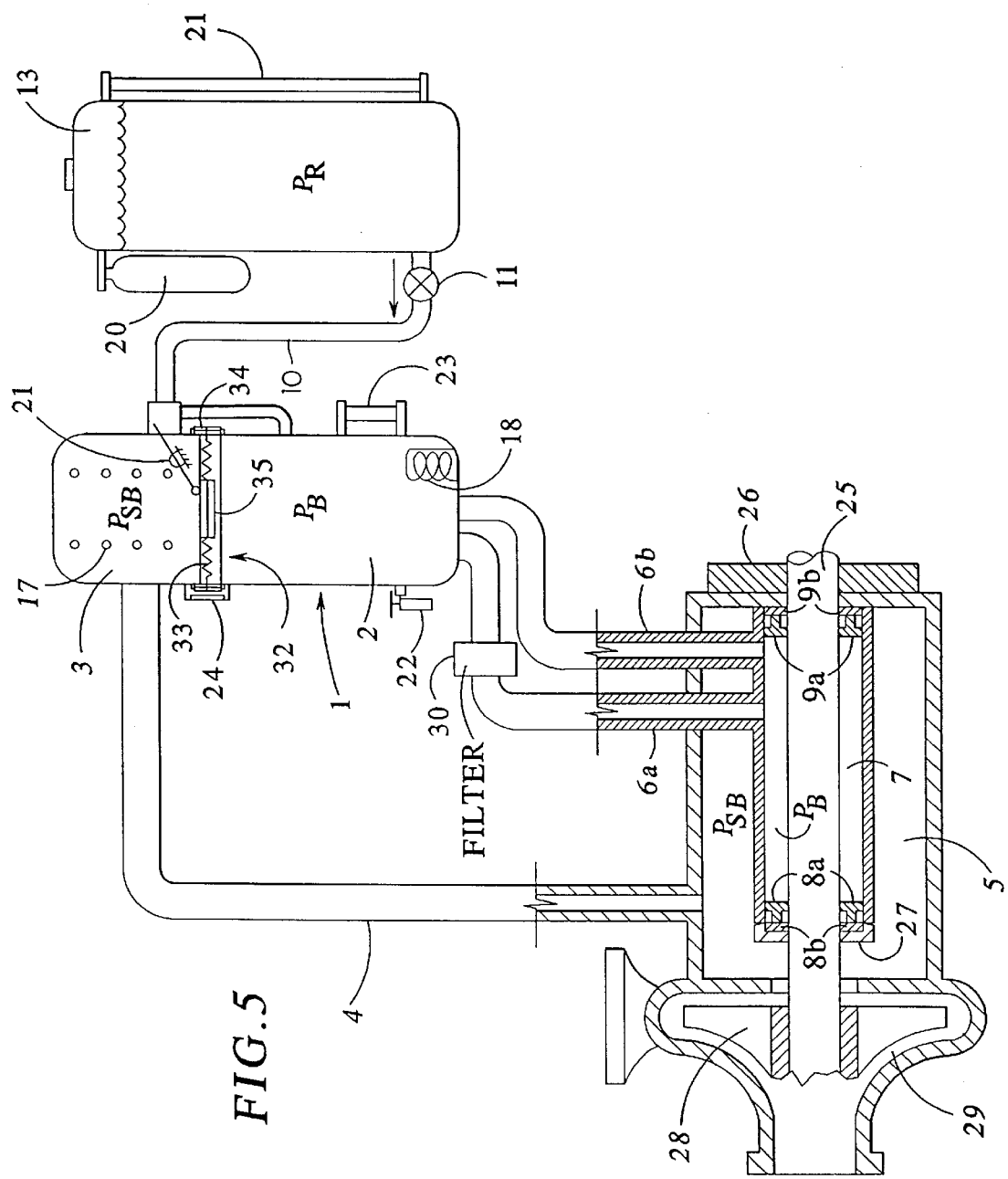
FIG. 5 is a schematic illustration of a fifth embodiment of a seal system constructed in accordance with the principles of the present invention.

FIG. 5 shows a further embodiment which is the same as FIG. 1 except that instead of the moveable wall being formed by a bellows, the moveable wall is formed by a diaphragm assembly 32. The diaphragm assembly 32 includes an elastomeric sheet 33, which may be corrugated, which is clamped at its periphery in a clamp 34, so as to divide the container 1 into the aforementioned upper and lower chambers 2 and 3. The diaphragm assembly 32 may include a rigid center element 35, so as to improve stability, The operation of the embodiment of FIG. 5 is the same as described in connection with the embodiment of FIG. 1.

Figure 6:
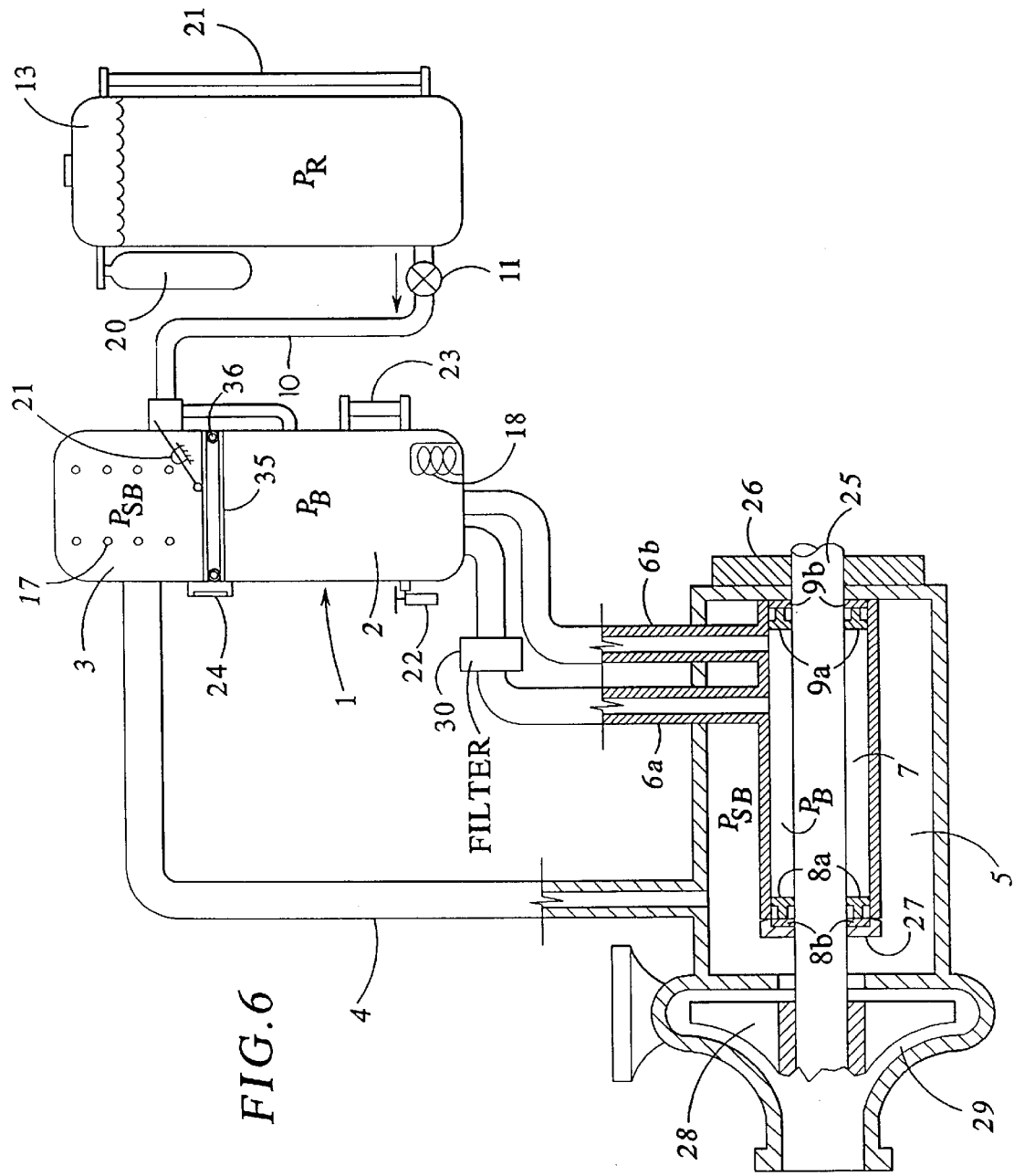
FIG. 6 is a schematic illustration of a sixth embodiment of a seal system constructed in accordance with the principles of the present invention.

In the embodiment of FIG. 6, the moveable wall is formed by a floating piston 35, which is moveable within the container 1 so as to assume the aforementioned pressure equilibrium. The floating piston 35 has an annular recess in which an O-ring 36 is received, to seal the lower chamber 2 from the upper chamber 3. The operation of the embodiment of FIG. 6 is otherwise the same as described in connection with the embodiment of FIG. 1.

In any of the embodiment s a heat exchanger coil 18 may be disposed in the lower chamber 2 (or surrounding one or both of lines 6a and 6b) so as to heat or cool the barrier fluid 2 which is supplied to the space 7 in the stuffing box 5. This will maintain proper barrier fluid temperature for each application.

Another option is to provide a sampling valve 22 in the lower chamber 2 of the container 1 so that a small quantity of barrier fluid 22 can, if desired, be periodically removed to check it for contamination and/or to determine that the barrier fluid 22, over time, has not deteriorated in terms of its desired properties and/or to determine the condition of the inboard or outboard seals.

Further, respective check valves can be provided in the lines 6a and 6b leading from the lower chamber 2 in the container 1 to the space 7 in the stuffing box 5 embodiments, the check valves permitting only flow in a direction into the space 7.

FIG. 7 shows a further variation of the embodiment shown in FIG. 4. Specifically, the container 1b contains the barrier fluid chamber 2, the process fluid chamber 3 and the barrier fluid reservoir chamber 13. However, the reservoir 13 is disposed below the barrier fluid chamber 2, not above as illustrated in FIG. 4. A wall or base 41 separates the barrier fluid reservoir chamber 13 from the barrier fluid chamber 2. The gas bottle 20 and regulator 42 serve as a barrier fluid replenisher, similar to that shown in FIG. 4. Pressure on the surface of the barrier fluid contained within the reservoir 13 forces fluid up through the check valve 43, through the tube 44 and out the valve 45. The valve 45 may be a needle valve, or a similar fine-control valve.

The bellows 46 which define the process fluid chamber 3 are contained within a retainer housing 47. The retainer housing 47 has a base 48 with an opening therein so that the exterior of the bellows 46 is in communication with the upper chamber 2. The exterior of the bellows 46 is therefore at $P_b$ and the interior is at $P_{sb}$, so these pressures cause the bellows to strive to attain an equilibrium position. The base 48 prevents the bellows 46 from expanding too far downward which could result in damage to the bellows 46. The line 4 which provides communication in a form of process fluid between the process fluid chamber 3 and the stuffing box 5 (see FIGS. 1–6) is connected to a tube 51. A distal end 52 of the tube 51 limits the upward movement of the bellows 46 and prevents complete collapse or compression of the bellows 46.

One advantage to the embodiment shown at FIG. 7 is the placement of the fill fitting 57 which enables the barrier fluid chamber 2 to be filled relatively easily. Further, the threaded cap 58 facilitates the initial filling of the process fluid chamber 3. An additional valve 59 and line 61 are provided in the barrier fluid reservoir chamber 13. The valve 59 opens when the barrier fluid chamber 2 reaches a pressure of less than atmospheric pressure. Barrier fluid will then flow from the reservoir 13, through the valve 59 and line 61 into the barrier fluid chamber 2. If the pressure in chamber 2 exceeds the pressure in the chamber 13 by a predetermined amount, such as if the chamber 2 reaches an excessively high temperature, valve 64 will open and relieve the upper chamber pressure by delivering a quantity of barrier fluid back to the reservoir 13.

The position of the bellows 46 at the upper end of the container 1b also facilitates periodic maintenance of the bellows 46. Further, the design illustrated in FIG. 7 enables both lines 44 and 61, which provide communication from the barrier fluid reservoir chamber 13 to the barrier fluid chamber 2, to be disposed inside the container 1b as opposed to outside the containers as illustrated in FIGS. 1–6. Further, placing the bellows 46 at the top of the container 1b and placing the process fluid inside the bellows enables the diameter and number of convolutions of the bellows to be reduced, thereby lowering manufacturing costs.

Another feature of the embodiment shown in FIG. 7 is the placement of the heat exchanger coil 18a and its inlet and outlet ports 62, 63. It has also been found that the embodiment shown in FIG. 7 is more readily fabricated from commercially available components and with more conventional assembly and servicing practices than the embodiments shown in FIGS. 1–6. In addition to the sight glass 21 provided for the barrier fluid reservoir chamber 13, a sight glass 53 may be provided for the barrier fluid chamber 2. Adjustable relief valve and rupture disks are provided at 54, 55 and 56.

Turning to FIG. 8, instead of the bellows 46 shown in FIG. 7, a floating piston 36 is utilized within the retainer housing 47 similar to the embodiment shown in FIG. 6. An O-ring 36a is used to provide a seal between the process fluid chamber 3 and barrier fluid chamber 2.

As illustrated in FIG. 9, a diaphragm assembly 32a may be utilized that includes an elastomeric sheet 33a which is held in place by a clamp 34a in a fashion similar to that shown in FIG. 5. The clamp 34a and diaphragm 33a separate the process fluid chamber 3 from the barrier fluid chamber 2 as discussed above. A rigid center element 35a may be used to enhance stability.

In any of the embodiments of FIGS. 7, 8 and 9, the distal end 52 of the tube 51 can be provided with a number of axial projections, with spaces therebetween, which abut the bottom of the bellows 46, the floating piston 36 or the center element 35a, so as to prevent any of those structures from completely closing, and thereby sealing, the distal end 52.

Although various modifications and changes may be suggested by those skilled in the art, it is the intention of the inventor to embody within the patent warranted hereon all changes and modifications as reasonably and properly come within the scope of his contribution to the art.

I claim as my invention:

1. In a seal assembly having a stuffing box containing an outboard seal, an inboard seal exposed to process fluid at a stuffing box pressure, and a pressurizable space in said stuffing box in which said outboard and inboard seals are disposed, the improvement comprising:

a container comprising three chambers including a process fluid chamber, a barrier fluid chamber and a barrier fluid reservoir chamber;

a movable impermeable first wall disposed in said container and separating said process fluid and said barrier fluid chambers;

an impermeable second wall disposed in said container and separating said barrier fluid and said barrier fluid reservoir chamber;

means for supplying barrier fluid to said barrier fluid chamber for filling said barrier fluid chamber with said barrier fluid;

means for supplying said barrier fluid from said barrier fluid chamber to said space in said stuffing box for applying pressure to said outboard seal and to said inboard seal; and means for placing said process fluid chamber and said stuffing box in fluid communication for placing said process fluid chamber at said stuffing box pressure and for causing said first wall to constantly assume an equilibrium state at which substantially no pressure differential exists across said inboard seal.

2. The improvement of claim 1, wherein said means for supplying barrier fluid to said barrier fluid chamber comprises:

a barrier fluid line passing through said second wall and providing fluid communication between said barrier fluid reservoir chamber and said barrier fluid chamber; and a one-way valve disposed in said barrier fluid line permitting flow of barrier fluid only in a direction from said barrier fluid reservoir chamber into said barrier fluid chamber.

3. The improvement of claim 2 wherein said barrier fluid reservoir chamber is disposed underneath said barrier fluid and process fluid chambers.

4. The improvement of claim 1, wherein said means for placing said process fluid chamber and said stuffing box in fluid communication comprises:

a process fluid line connecting said stuffing box to a tube, said tube connecting said process fluid line to said process fluid chamber, an end of said tube being disposed within said process fluid chamber; and the end of said tube preventing said first wall from moving past the end of said tube.

5. The improvement of claim 1, wherein said first wall comprises a bellows.

6. The improvement of claim 1, wherein said first wall comprises a diaphragm.

7. The improvement of claim 1, wherein said first wall comprises a floating piston.

8. The improvement of claim 1, wherein said first wall is composed of metal.

9. The improvement of claim 1, wherein said first wall is composed of an elastomer.

10. The improvement of claim 1, wherein said container comprises a retainer housing for accommodating said first wall, said retainer housing comprises an annular wall surface which limits outward movement of the first wall.

11. The improvement of claim 1, further comprising cooling means disposed in said barrier fluid chamber for reducing a temperature of said barrier fluid in said barrier fluid chamber.

12. The improvement of claim 1, wherein said means for supplying barrier fluid to said barrier fluid chamber comprises:

a pressure source communicating with said barrier fluid reservoir chamber for pressurizing barrier fluid in said barrier fluid reservoir chamber; and a barrier fluid line passing through said second wall and providing fluid communication between said barrier fluid reservoir chamber and said barrier fluid chamber.

13. The improvement of claim 12, wherein said pressure source comprises a gas bottle.

14. The improvement of claim 12, further comprising means disposed in said container responsive to a position of said first wall in said process fluid chamber for permitting flow of barrier fluid into said barrier fluid chamber dependent on said position of said first wall in said container.

15. The improvement of claim 1, wherein said means for supplying barrier fluid from said barrier fluid chamber to said space in which said outboard seal is disposed comprises a single fluid line connecting said barrier fluid chamber and said space.

16. The improvement of claim 1, wherein said means for supplying barrier fluid from said barrier fluid chamber to said space in which said outboard seal is disposed comprises two fluid lines each connecting said barrier fluid chamber to said space.

17. The improvement of claim 1, wherein said container further comprises a base portion mounted at a top portion of said container within said barrier fluid chamber, said base portion being sized to house said first wall.

18. The improvement of claim 17, wherein said base portion comprises an outer surface having means forming an aperture therein, said aperture allowing said first wall to communicate with said barrier fluid chamber, wherein said outer surface limits outward movement of said first wall.

19. The improvement of claim 1, further comprising means for limiting leakage of said barrier fluid at one of said seals to no greater than 50 cc per month.

20. The improvement of claim 1, further comprising a fluid conduit for transferring barrier fluid between said barrier fluid reservoir and said barrier fluid chamber, said fluid conduit being disposed within said container.

21. In a seal assembly having a stuffing box containing an outboard seal, an inboard seal exposed to process fluid at a stuffing box pressure, and a pressurizable space in said stuffing box in which said outboard and inboard seals are disposed, the improvement comprising:

a container comprising three chambers including a process fluid chamber, a barrier fluid chamber and a barrier fluid reservoir chamber;

a moveable impermeable first wall disposed in said container and separating said process fluid and said barrier fluid chambers;

an impermeable second wall disposed in said container and separating said barrier fluid and said barrier fluid reservoir chamber;

a barrier fluid line connecting said barrier fluid reservoir chamber to said barrier fluid chamber;

means for supplying said barrier fluid from said barrier fluid chamber to said space in said stuffing box for applying pressure to said outboard seal and to said inboard seal;

a process fluid line connecting said stuffing box to said process fluid chamber, an end of said process fluid line being disposed within said process fluid chamber, the end of said process fluid preventing said first wall from moving past the end of said tube; and a retainer housing for accommodating said first wall, said retainer housing comprises an annular wall surface which limits outward movement of said first wall.

22. The improvement of claim 21, wherein said barrier fluid reservoir chamber is disposed vertically below said barrier fluid chamber.

23. The improvement of claim 21, wherein said barrier fluid chamber is disposed below said process fluid chamber.

24. The improvement of claim 21, wherein said barrier fluid line is disposed within said container.

25. The improvement of claim 21, further including a valve coupled to said barrier fluid line.

26. The improvement of claim 25, wherein said valve selectively opens when said barrier fluid chamber attains a pressure less than atmospheric pressure to allow fluid to pass between said barrier fluid reservoir chamber and said barrier fluid chamber.

27. In a seal assembly having a stuffing box containing an outboard seal, an inboard seal exposed to process fluid at a stuffing box pressure, and a pressurizable space in said stuffing box in which said outboard seal and said inboard seal are disposed, the improvement comprising:

a container comprising three chambers including a process fluid chamber, a barrier fluid chamber and a barrier fluid reservoir chamber;

a moveable impermeable first wall disposed in said container and separating said process fluid and said barrier fluid chambers;

an impermeable second wall disposed in said container and separating said barrier fluid and said barrier fluid reservoir chamber;

a source of pressurized gas communicating with said barrier fluid reservoir chamber for pressurizing barrier fluid in said barrier fluid reservoir chamber;

a barrier fluid line connecting said barrier fluid reservoir chamber and said barrier fluid chamber;

means for supplying said barrier fluid from said barrier fluid chamber to said space in said stuffing box applying pressure to said outboard seal and to said inboard seal;

means for placing said process fluid chamber and said stuffing box in fluid communication for placing said process fluid chamber at said stuffing box pressure and for causing said first wall to constantly assume an equilibrium state at which substantially no pressure differential exists across said inboard seal; and valve means for selectively admitting barrier fluid into said barrier fluid chamber from said barrier fluid reservoir chamber via said barrier fluid line.

28. A method for preventing mixing of process fluid and barrier fluid in a seal assembly having a stuffing box containing an outboard seal, an inboard seal exposed to process fluid at a stuffing box pressure, and a pressurizable space in said stuffing box in which said outboard seal and said inboard seal and disposed, said method comprising the steps of:

providing a container and dividing said container three chambers including a process fluid chamber, a barrier fluid chamber and a barrier fluid reservoir chamber by a moveable impermeable first wall disposed in said container between said process fluid chamber and said barrier fluid chamber and an impermeable second wall between said barrier fluid chamber and said barrier fluid reservoir chamber;

supplying barrier fluid to said barrier fluid chamber and filling said barrier fluid chamber with said barrier fluid;

supplying said barrier fluid from said barrier fluid chamber to said space in said stuffing box for applying pressure to said outboard seal and to said inboard seal; and placing said process fluid chamber and said stuffing box in fluid communication and thereby placing said process fluid chamber at said stuffing box pressure for causing said first wall to constantly assume an equilibrium state at which substantially no pressure differential exists across said inboard seal.

* * * * *